United States Patent Office 3,541,101
Patented Nov. 17, 1970

1

3,541,101
ISOXAZOLO[5,4-b]PYRIDINES, 5,6 - POLYMETHYL-ENEISOXAZOLO[5,4 - b]PYRIDINES AND PROCESSES THEREFOR
John H. Markillie, Cooper Township, Kalamazoo County, Mich., assignor to The Upjohn Company, Kalamazoo, Mich., a corporation of Delaware
No Drawing. Filed Mar. 4, 1966, Ser. No. 531,746
Int. Cl. C07d 85/22
U.S. Cl. 260—288           6 Claims

ABSTRACT OF THE DISCLOSURE

This invention relates to isoxazoles and to processes for their preparation. It is more particularly directed to isoxazolo[5,4-b]pyridines represented by the formula

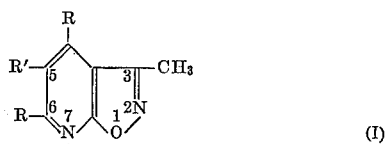

(I)

wherein R is selected from the group consisting of lower-alkyl, phenyl, lower-alkylphenyl, lower-alkoxyphenyl, and halophenyl, R' has the same meaning as R and in addition hydrogen; and 5,6-polymethyleneisoxazolo[5,4-b]pyridines of the formula

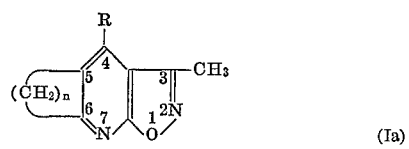

(Ia)

wherein R" is selected from the group consisting of phenyl, lower-alkylphenyl, lower-alkoxyphenyl and halophenyl, n is an integer of from 3 to 6, inclusive; also the acid addition salts of the compounds embraced by the above Formulae I, Ia. The compounds of Fomula I are useful as anti-fungals while those of Formula Ia are useful as anti-inflammatories.

---

As use in this specification, the term "lower-alkyl" means alkyl of from 1 to 4 carbon atoms, inclusive, e.g., methyl, ethyl, propyl, butyl, and isomeric forms thereof; the term "halophenyl" means halogen-substituted phenyl wherein the halogen is selected from chlorine, bromine, iodine, and fluorine; the term "lower-alkoxyphenyl" means phenyl substituted with one or more alkoxys of from 1 to 4 carbon atoms, inclusive, e.g., methoxyphenyl, trimethoxyphenyl, ethoxyphenyl, propoxyphenyl, butoxyphenyl, dibutoxyphenyl, and isomeric forms thereof; the term "lower-alkylpheny" means phenyl substituted with one or more alkyls of from 1 to 4 carbon atoms, inclusive, e.g., toyl, xylyl, trimethylphenyl, ethylpheny, butylphenyl, and isomeric forms thereof.

2

The novel isoxazolo[5,4-b]pyridines of Formulae I and Ia exist either in the nonprotonated (free base) form or in the protonated (acid addition salt) form depending on the pH of the environment. They form stable protonates, i.e., acid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I and Formula Ia compounds form salts with fluosilicic acid which are useful as mothproofing agents according to U.S. Pat. 1,915,334 and 2,075,359. They also form salts with thiocyanic acid which condense with formaldehyde to form resinous materials useful as pickling inhibitors according to U.S. Pat. 2,425,320 and 2,606,155. They also form salts with trichloroacetic acid which are useful as herbicides, for example, against Johnson grass, yellow foxtail, green foxtail, Bermuda grass, and quackgrass.

The novel isoxazolo[5,4-b]pyridines of Formula I are prepared by treating the known compound 5-amino-3-methylisoxazole of the Formula

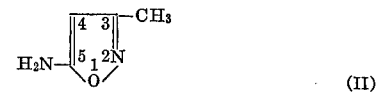

(II)

with a corresponding diketone of the formula

(III)

wherein R and R' have the same meaning as above, in the presence of an acid catalyst.

5-amino-3-methylisoazole (II) is known in the art; it can be prepared by reacting 3-iminobutyronitrile with hydroxylamine; also by the procedure described in Ann. 624, 22 (1959).

The diketones of Formula III are well known in the art and a wide variety of them have been prepared by known methods, e.g., in accordance with Organic Syntheses 20, 32 (1940) and volume VIII, page 133 of "Organic Reactions," John Wiley and Sons, Inc., New York, 1954. Among the known diketones that can be employed in the novel process are 1,3-diphenyl-1,3-propanedione; 1,3-di(p-tolyl)-1,3-propanedione; 1,3-di(m-chlorophenyl) - 1,3 - propanedione; 1,3-di(p-chlorophenyl)-1,3-propanedione; 1,3 - di(p-methoxyphenyl) - 1,3-propanedione; 1,3-di(p-bromophenyl)-1,3-propanedione; 2,4-pentanedione; 3-methyl-2,4-pentanedione; 3-ethyl-2,4-pentanedione; 3-butyl-2,4-pentanedione; 3-phenyl-2,4-pentanedione; 3-isopropyl-2,4-pentanedione; 3-isobultyl-2,4-pentanedione, and the like. Representative starting materials of Formula III and publications describing their preparation are set forth in the table that follows.

| Starting material (III) | Publication |
|---|---|
| 3-methyl-2,4-pentanedione | J. Amer. Chem. Soc., 77, 1754 (1955). |
| 3-ethyl-2,4-pentanedione | J. Soc. Chem. Ind., 44, 462T (1925); named 3-ethylacetylacetone. |
| 3-butyl-2,4-pentanedione | J. Amer. Chem. Soc., 72, 3638 (1950); named n-butylacetylacetone. |
| 3-isopropyl-2,4-pentanedione | J. Amer. Chem. Soc. 72, 3640 (1950); named isopropylacetylacetone (IX). |
| 3-isobutyl-2,4-pentanedione | J. Amer. Chem. Soc., 72, 3635 (1950). |
| 1,3-di(p-tolyl)-1,3-propanedione | Part A of Example 2 of U.S. Patent 3,203,594. |
| 1,3-di(m-chlorophenyl)-1,3-propanedione | Chem. Ber., 86, 1263 (1952). |
| 1,3-di(p-chlorophenyl)-1,3-propanedione | Chem. Ber., 84, 607 (1951); 86 1263 (1953). |
| 1,3-di(p-bromophenyl)-1,3-propanedione | Ann., 618, 110 (1958). |
| 1,3-di(p-methoxyphenyl)-1,3-propanedione | Chem. Ber., 84, 607 (1951). |
| 3,5-heptanedione | J. Amer. Che. Soc., 66, 1220 (1944). |
| 4,6-nonanedione | Arkiv. Kemi., 3, 365 (1951). |
| 2,6-dimethyl-3,5-heptanedione | Arkiv. Kemi., 3, 365 (1951). |
| 5,7-undecanedione | Zhur. Obschei. Kim., 28, 2845 (1958). |
| 2,8-dimethyl-4,6-nonanedione | Org. Syntheses, 28, 44 (1948); J. Amer. Chem. Soc., 72, 1352 (1950); named diisovalerylmethane in both. |
| 2,2,6,6-tetramethyl-3,5-heptanedione | J. Amer. Chem. Soc., 73, 901 (1951). |
| 4-methyl-3,5-heptanedione | J. Org. Chem., 23, 879 (1958). |
| 2-ethyl-1,3-diphenyl-1,3-propanedione | J. Amer. Chem. Soc., 73, 5660 (1951). |
| 1,2,3-triphenyl-1,3-propanedione | J. Amer. Che. Soc., 77, 6531 (1955) (Compound XXV); J. Org. Chem., 4, 93 (1939), named phenyldibenzoylmethane; J. Chem. Soc., 107 520 (1915), named dibenzoylphenylmethane |
| 1,3-di(p-fluorophenyl)-1,3-propanedione | Ann., 618, 110 (1958). |
| 1,3-di-(p-iodophenyl)-1,3-propanedione | Ann., 618, 110 (1958). |
| 1,3-di(2,4-dimethoxyphenyl)-1,3-propanedione | J. Chem. Soc., 3315 (1956); J. Org. Chem., 24, 18, 1381 (1959). |

Suitable acid catalysts include, for example, concentrated sulfuric acid, phosphorus pentoxide, phosphorus pentachloride, polyphosphoric acid and the like, the lattermost being preferred.

In carrying out the reaction between 5-amino-3-methylisoxazole (II) and the diketone of Formula III, the two reactants are mixed with the acid catalyst and the mixture heated, e.g., between about 50° C. to about 175° C., preferably between about 100° C. to about 140° C. Inert solvents are not necessary but can be employed, if desired. The molecular ratio of the compounds of Formula II and Formula III can be varied, equimolar ratios of about 1:1 having been found satisfactory. The time required for the completion of the reaction depends upon such factors as the reaction temperature, the particular reactants employed, the relative amounts of reactants, thoroughness of mixing, and the like. Therefore, it will be understood that the optimum reaction time will vary for each set of reaction conditions. Ordinarily, reaction times ranging from about 10 minutes to about 1 hour are suitable. After completion of the reaction, the reaction mixture is diluted with water and neutralized with a base (e.g., ammonium hydroxide) and the thus-produced isoxazolo[5,4-b]pyridine of Formula I isolated from the reaction mixture in its free base form, using conventional procedures such as filtration, solvent evaporation, solvent extraction, chromatography or crystallization, or a combination of these methods. Each of the free bases so obtained can be purified, e.g., by recrystallization from a suitable solvent or pair of solvents. The free base can be converted to any desired acid addition salt by neutralization with an acid, e.g., any of those given above.

The novel 5,6-polymethyleneisoxazolo[5,4-b]pyridines of Formula Ia are prepared by treating 5-amino-3-methylisoxazole (II) with a corresponding 2-benzoylcycloalkanone of the formula

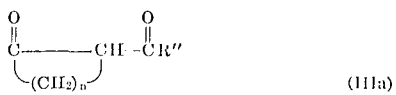
(IIIa)

wherein R″ and n have the same meaning as above, in the presence of an acid catalyst.

The 2-benzoylcycloalkanones of Formula IIIa wherein R″ is benzoyl or substituted benzoyl, many of which are known, can be prepared in accordance with the methods described in Ann. 650, 133–156 (1961); J. Amer. Chem. Soc. 82, 2389–2393 (1960); J. Org. Chem. 28, 379–383 (1963). Among the known 2-benzoylcycloalkanones that can be employed in the novel process are 2-(p-methylbenzoyl)cyclopentanone, 2-(p-methoxybenzoyl)cyclopentanone, 2-(p-iodobenzoyl)cyclopentanone, 2-benzoylcyclohexanone, 2-(m-chlorobenzoyl)cyclohexanone, 2-(p-fluorobenzoyl)cyclohexanone, 2 - (p-methoxybenzoyl)cyclo - hexanone, 2-benzoylcycloheptanone, 2-benzoylcyclooctanone, and the like. Representative starting materials of Formula IIIa and publications describing their preparation are set forth in the table that follows.

| Starting material (IIIa) | Publication |
|---|---|
| 2-benzoylcyclooctanone | J. Org. Chem., 24, 583 (1959). |
| 2-(p-ethylbenzoyl)cyclooctanone | J. Org. Chem., 24, 583 (1959); named 2-propionylcyclooctanone. |
| 2-benzoylcycloheptanone | J. Org. Chem. 24, 583 (1959). |
| 2-benzoylcyclohexanone | J. Amer. Chem. Soc., 78, 6066 (1956). |
| 2-(p-methylbenzoyl)cyclohexanone | J. Amer. Chem. Soc., 82, 2389 (1960). |
| 2-(p-propylbenzoyl)cyclohexanone | J. Amer. Chem. Soc., 67 284 (1945); named 2-butyrylcyclohexanone. |
| 2-(m-ethoxybenzoyl)cyclohexanone | J. Amer. ChemSoc., 78. 6066 (1956) discloses corresponding p-methoxy isomer (named 2-anisoylcyclohexanone). |
| 2-(p-chlorobenzoyl)cyclohexanone | J. Amer. Chem. Soc., 82, 2389 (1960). |
| 2-(p-bromobenzoyl)cyclohexanone | J. Amer. Chem. Soc., 82, 2389 (1960) discloses corresponding o-isomer. |
| 2-benzoylcyclopentanone | J. Amer. Chem. Soc., 78, 6066 (1956). |
| 2-(p-ethylbenzoyl)cyclopentanone | Chem.Ber., 93, 909 (1960); named 2-propionylcyclopentanone. |
| 2-(m-methoxy)cyclopentanone | J. Amer. Chem. Soc., 78, 6066 (1956) discloses corresponding p-isomer (named 2-anisoylcyclopentanone). |

Suitable acid catalysts include those employed in the preparation of the compounds of Formula I, recited above.

The method of preparing the 5,6-polymethylene isoxazolo[5,4-b]pyridines of Formula Ia and their acid addition salts, namely, by treating 5-amino-3-methylisoxazole (II) with a corresponding 2-benzoylcycloalkanone (IIIa) in the presence of an acid catalyst, employs the same procedures under the same conditions as in the synthesis of the compounds of Formula I described above; the only difference is that 2-benzoylcycloalkanones (IIIa) are used instead of the diketones of Formula III.

The novel compounds of Formulae I and Ia, in their free base form and in the form of their acid addition salts with pharmacologically acceptable acids, for example, hydrochloric, hydrobromic, sulfuric, phosphoric, nitric, acetic, benzoic, salicylic, glycolic, succinic, nicotinic, tartaric, maleic, malic, lactic, methanesulfonic, and cyclohexanesulfamic acids, and the like, exhibit biological activity. The compounds of Formula I possess anti-fungal properties. Illustratively, they inhibit the growth of the pathogen *Trichophyton rubrum* and can be used in the treatment of infections due to this microorganism in mammals and animals, e.g., cats and dogs. These compounds are also effective herbicides and can be used in the control of crabgrass, quackgrass, bindweed, pigweed and lambquarters. The compounds of Formula Ia possess antiinflammatory activity; they can be used in the treatment of inflammatory conditions of the skin, eyes and respiratory tract of mammals and animals, e.g., mice, rats and birds.

EXAMPLE 1

3,4,6-trimethylisoxazolo[5,4-b]pyridine (I)

A mixture of 98 g. (1 mole) of 5-amino-3-methylisoxazole (II) and 110 ml. (1.07 moles) of acetylacetone (alternatively named 2,4-pentanedione) in about 150 ml. of polyphosphoric acid was warmed to 30° C. and then cooled rapidly in an ice bath. The temperature of the reaction mixture rose rapidly to 140° C. despite the external cooling. It was stirred at this temperature for about 15 minutes and then cooled to room temperature. Then, with cooling, 500 ml. of water and concentrated ammonium hydroxide was added until the solution was at pH 8. The mixture was cooled to 5° C. and filtered. The solid was recrystallized from 800 ml. of a mixture of equal parts of isopropanol and water to give 105 g. (65% yield) to 3,4,6-trimethylisoxazolo[5,4-b]pyridine (I), melting at 92 to 93° C.

Analysis.—Calcd. for $C_9H_{10}N_2O$ (percent): C, 66.22; H, 6.22; N, 17.27. Found (percent): C, 66.62; H, 6.26; N, 17.26.

Infrared and nuclear magnetic resonance (NMR) spectra support the structure of the thus-produced compound.

The addition of a diethyl ether solution of hydrogen chloride, hydrogen bromide, sulfuric acid, phosphoric acid, acetic acid, benzoic acid, salicyclic acid, citric acid, succinic acid, malic acid, cyclohexanesulfamic acid, thiocyanic acid or trichloroacetic acid, etc. to an ethanol solution of 3,4,6-trimethylisoxazolo[5,4-b]pyridine, followed by addition of about 4 volumes of diethyl ether, gives the corresponding acid addition salt.

EXAMPLE 2

3,4,6-trimethyl-5-phenylisoxazolo[5,4-b]pyridine (II)

A mixture of 9.8 g. (0.1 mole) of 5-amino-3-methylisoxazole (II) and 20 g. (0.11 mole) of 3-phenyl-2,4-pentanedione in about 25 ml. of polyphosphoric acid was warmed slowly to about 100° C. at which point it rose rapidly to about 155° C. The reaction mixture was heated at 140 to 160° C. for a half hour, then cooled. Then 200 ml. of water and concentrated ammonium hydroxide were added until the reaction mixture was neutral. The brown solid was separated by filtration. This material was recrystallized twice from ethanol with decolorizing charcoal treatment to give 12.5 g. (53% yield) of 3,4,6-trimethyl-5-phenylisoxazolo[5,4-b]pyridine (I), melting at 208.5 to 210° C.

Analysis.—Calcd. for $C_{15}H_{14}N_2O$ (percent): C, 75.60; H, 5.92; N, 11.76. Found (percent): C, 75.76; H, 5.93; N, 11.84.

Infrared and NMR spectra support the structure.

The addition of a diethyl ether solution of hydrogen chloride, hydrogen bromide, sulfuric acid, phosphoric acid, acetic acid, benzoic acid, salicylic acid, citric acid, succinic acid, malic acid, cyclohexanesulfamic acid, thiocyanic acid or trichloroacetic acid, etc. to an ethanol solution of 3,4,6-trimethyl - 5-phenylisoxazolo[5,4-b]pyridine, followed by addition of about 4 volumes of diethyl ether, gives the correspounding acid addition salt.

EXAMPLE 3

3-methyl-4,6-diphenylisoxazolo[5,4-b]pyridine (I)

A mixture of 9.8 g. (0.1 mole) of 5-amino-3-methylisoxazole (II) and 22.5 g. (0.1 mole) of 1,3-diphenyl-1,3-propanedione in about 25 ml. of polyphosphoric acid was heated slowly to 140° C. The temperature then rose rapidly to 160° C. The reaction mixture was kept at this temperature for 20 minutes, cooled and a large volume of water added. Then concentrated ammonium hydroxide was added until the reaction mixture was neutral. The solid was filtered and discarded. The filtrate was extracted with ether. The ether layer was dried and concentrate dunder vacuum. The residue was recrystallized from 250 ml. of isopropanol to give 2.7 g. (10% yield) of 3-methyl-4,6-diphenylisoxazolo[5,4-b]pyridine (I), melting at 157 to 158.5° C.

Analysis.—Calcd. for $C_{19}H_{14}N_2O$ (percent): C, 79.70; H, 4.93; N, 9.78. Found (percent): C, 79.59; H, 4.72; N, 9.83.

Infrared and NMR spectra support the structure.

Following procedures similar to those of Examples 1, 2 and 3 and the general methods for preparing the compounds of Formula I described above, but employing the following diketones;

3-methyl-2,4-pentanedione,
3-ethyl-2,4-pentanedione,
3-butyl-2,4-pentanedione,
3-isopropyl-2,4-pentanedione,
3-isobutyl-2,4-pentanedione,
1,3-di(p-tolyl)-1,3-propanedione,
1,3-di(m-chlorophenyl)-1,3-propanedione,
1,3-di(p-chloropenyl)-1,3-propanedione,
1,3-di(p-bromophenyl)-1,3-propanedione,
1,3-di(p-methoxyphenyl)-1,3-propanedione,
3,5-heptanedione,
4,6-nonanedione,
2,6-dimethyl-3,5-heptanedione,
5,7-undecanedione,
2,8-dimethyl-4,6-nonanedione,
2,2,6,6-tetramethyl-3,5-heptanedione,
4-methyl-3,5-heptanedione,
5-ethyl-4,6-nonanedione,
2-ethyl-1,3-diphenyl-1,3-propanedione,
1,2,3-triphenyl-1,3-propanedione,
1,3-diphenyl-2-(p-tolyl)-1,3-propanedione,
1,3-di(p-fluorophenyl)-1,3-propanedione,
1,3-di(p-iodophenyl)-1,3-propanedione,
1,3-dimesityl-1,3-propanedione,
1,3-di(2,4-dimethoxyphenyl)-1,3-propanedione, and
1,3-di(2,4,6-trichlorophenyl)-1,3-propanedione, yield, respectively, 3,4,5,6-tetramethylisoxazolo[5,4-b]pyridine,
3,4,6-trimethyl-5-ethylisoxazolo[5,4-b]pyridine,
3,4,6-trimethyl-5-butylisoxazolo[5,4-b]pyridine,
3,4,6-trimethyl-5-isopropylisoxazolo[5,4-b]pyridine,
3,4,6-trimethyl-5-isobutylisoxazolo[5,4-b]pyridine,
3-methyl-4,6-di(p-tolyl)isoxazolo[5,4-b]pyridine,
3-methyl-4,6-di(m-chlorophenyl)isoxazolo[5,4-b]pyridine,
3-methyl-4,6-di(p-chlorophenyl)isoxazolo[5,4-b]pyridine,
3-methyl-4,6-di(p-bromophenyl)isoxazolo[5,4-b]pyridine,
3-methyl-4,6-di(p-methoxyphenyl)isoxazolo[5,4-b]pyridine,
3-methyl-4,6-diethylisoxazolo[5,4-b]pyridine,
3-methyl-4,6-dipropylisoxazolo[5,4-b]pyridine,
3-methyl-4,6-diisopropylisoxazolo[5,4-b]pyridine,
3-methyl-4,6-dibutylisoxazolo[5,4-b]pyridine,
3-methyl-4,6-diisobutylisoxazolo[5,4-b]pyridine,
3-methyl-4,6-di-t-butylisoxazolo[5,4-b]pyridine,
3,5-dimethyl-4,6-diethylisoxazolo[5,4-b]pyridine,
3-methyl-4,6-dipropyl-5-ethylisoxazolo[5,4-b]pyridine,
3-methyl-4,6-diphenyl-5-ethylisoxazolo[5,4-b]pyridine,
3-methyl-4,5,6-triphenylisoxazolo[5,4-b]pyridine,
3-methyl-4,6-diphenyl-5-(p-tolyl)isoxazolo[5,4-b]pyridine,
3-methyl-4,6-di(p-fluorophenyl)isoxazolo[5,4-b]pyridine,
3-methyl-4,6-di(p-iodophenyl)isoxazolo[5,4-b]pyridine,
3-methyl-4,6-dimesitylisoxazolo[5,4-b]pyridine,
3-methyl-4,6-di(2,4-dimethoxyphenyl)isoxazolo[5,4-b]pyridine, and
3-methyl-4,6-di(2,4,6-trichlorophenyl)isoxazolo[5,4-b]pyridine.

The addition of a diethyl ether solution of hydrogen chloride, hydrogen bromide, sulfuric acid, phosphoric acid, acetic acid, benzoic acid, salicylic acid, citric acid, succinic acid, malic acid, cyclohexanesulfamic acid, thiocyanic acid or trichloroacetic acid, etc. to an ethanol solution of an isoxazol[5,4-b]pyridine set forth in the preceding paragraph, followed by addition of about 4 volumes of diethyl ether, gives its corresponding acid addition salt.

EXAMPLE 4

4-(p-methoxyphenyl)-3-methyl-5,6-tetramethyleneisoxazolo[5,4-b]pyridine (Ia)

A mixture of 9.8 g. (0.1 mole) of 5-amino-3-methylisoxazole (II) and 23.2 g. (0.1 mole) of 2-(p-methoxybenzoyl)cyclohexanone in about 25 ml. of polyphosphoric acid was heated to about 70° C., at which point the temperature started to rise rapidly. The reaction mixture was cooled, again heated to about 120° C. when the temperature again rose rapidly. The reaction mixture was cooled, then heated to 130° to 150° C. for half an hour, again cooled and 250 ml. of water and concentrated ammonium hydroxide added until it was slightly alkaline. The reaction mixture had 1 l. of water added to it and then was extracted 3 times with chloroform. The organic layer was dried and concentrated to dryness. The residue was recrystallized three times from isopropanol (decolorizing charcoal treatment) to give 6.5 g. (22% yield) of white 4-(p-methoxyphenyl)-3-methyl - 5,6 - tetramethyleneisoxazolo[5,4-b]pyridine (Ia) melting at 160.5 to 162.5° C.

*Analysis.*—Calcd. for $C_{18}H_{18}N_2O_2$ (percent): C, 73.45; H, 6.16; N, 9.52. Found (percent): C, 73.44; H, 6.49; N, 9.39.

Infrared and NMR spectra support the structure.

Following the procedures similar to that of Example 4 and the general methods for preparing the compounds of Formula Ia described above, but employing the following 2-benzoylcycloalkanones:

2-benzoylcyclooctanone,
2-(p-ethylbenzoyl)cyclooctanone,
2-(m-isopropylbenzoyl)cyclooctanone,
2-(o-butylbenzoyl)cyclooctanone,
2-(p-ethxybenzoyl)cyclooctanone,
2-(m-isobutoxybenzoyl)cyclooctanone,
2-(o-fluorobenzoyl)cyclooctanone,
2-(m-iodobenzoyl)cyclooctanone,
2-benzoylcycloheptanone,
2-(o-methylbenzoyl)cycloheptanone,
2-(m-propylbenzoyl)cycloheptanone,
2-(p-isobutylbenzoyl)cycloheptanone,
2-(p-methoxybenzoyl)cycloheptanone,
2-(o-butyoxybenzoyl)cycloheptanone,
2-(m-chlorobenzoyl)cycloheptanone,
2-(p-bromobenzoyl)cycloheptanone,
2-benzoylcyclohexanone,
2-(p-methylbenzoyl)cyclohexanone,
2-(m-propylbenzoyl)cyclohexanone,
2-(p-isobutylbenzoyl)cyclohexanone,
2-(m-ethoxybenzoyl)cyclohexanone,
2-(p-propoxybenzoyl)cyclohexanone,
2-(p-chlorobenzoyl)cyclohexanone,
2-(m-bromobenzoyl)cyclohexanone,
2-benzoylcyclopentanone,
2-(p-ethylbenzoyl)cyclopentanone,
2-(m-isopropylbenzoyl)cyclopentanone,
2-(o-butylbenzoyl)cyclopentanone,
2-(m-methoxybenzoyl)cyclopentanone,
2-(p-isobutoxybenzoyl)cyclopentanone,
2-(o-chlorobenzoyl)cyclopentanone, and
2-(p-iodobenzoyl)cyclopentanone, yields, respectively, 4-phenyl-3-methyl-5,6-hexamethyleneisoxazolo[5,4-b]pyridine,
4-(p-ethylphenyl)-3-methyl-5,6-hexamethyleneisoxazolo-[5,4-b]pyridine,
4-(m-isopropylphenyl)-3-methyl-5,6-hexamethyleneisoxazolo-[5,4-b]pyridine,
4-(o-butylphenyl)-3-methyl-5,6-hexamethyleneisoxazolo-[5,4-b]pyridine,
4-(p-ethoxyphenyl)-3-methyl-5,6-hexamethyleneisoxazolo-[5,4-b]pyridine,
4-(m-isobutyoxyphenyl)-3-methyl-5,6-hexamethyleneisoxazolo-[5,4-b]pyridine,
4-(o-fluorophenyl)-3-methyl-5,6-hexamethyleneisoxazolo-[5,4-b]pyridine,
4-(m-iodophenyl)-3-methyl-5,6-hexamethyleneisoxazolo-[5,4-b]pyridine,
4-phenyl-3-methyl-5,6-pentamethyleneisoxazolo[5,4-b]pyridine,
4-(o-tolyl)-3-methyl-5,6-pentamethyleneisoxazolo[5,4-b]pyridine,
4-(m-propylphenyl)-3-methyl-5,6-pentamethyleneisoxazolo[5,4-b]pyridine,
4-(p-isobutylphenyl)-3-methyl-5,6-pentamethyleneisoxazolo[5,4-b]pyridine,
4-(p-methoxyphenyl)-3-methyl-5,6-pentamethyleneisoxazolo[5,4-b]pyridine,
4-(o-butoxyphenyl)-3-methyl-5,6-pentamethyleneisoxazolo[5,4-b]pyridine,
4-(m-chlorophenyl)-3-methyl-5,6-pentamethyleneisoxazolo[5,4-b]pyridine,
4-(p-bromophenyl)-3-methyl-5,6-pentamethyleneisoxazolo[5,4-b]pyridine,
4-phenyl-3-methyl-5,6-tetramethyleneisoxazolo[5,4-b]pyridine,
4-(p-tolyl)-3-methyl-5,6-tetramethyleneisoxazolo[5,4-b]pyridine,
4-(m-propylphenyl)-3-methyl-5,6-tetramethyleneisoxazolo[5,4-b]pyridine,
4-(p-isobutylphenyl)-3-methyl-5,6-tetramethyleneisoxazolo[5,4-b]pyridine,
4-(m-ethoxyphenyl)-3-methyl-5,6-tetramethyleneisoxazolo[5,4-b]pyridine,
4-(p-propoxyphenyl)-3-methyl-5,6-tetramethyleneisoxazolo[5,4-b]pyridine,
4-(p-chlorophenyl)-3-methyl-5,6-tetramethyleneisoxazolo[5,4-b]pyridine,
4-(m-bromophenyl)-3-methyl-5,6-tetramethyleneisoxazolo[5,4-b]pyridine,
4-phenyl-3-methyl-5,6-trimethyleneisoxazolo[5,4-b]pyridine,
4-(p-ethylphenyl)-3-methyl-5,6-trimethyleneisoxazolo-[5,4-b]pyridine,
4-(m-isopropylphenyl)-3-methyl-5,6-trimethyleneisoxazolo[5,4-b]pyridine,
4-(o-butylphenyl)-3-methyl-5,6-trimethyleneisoxazolo[5,4-b]pyridine,
4-(m-methoxyphenyl)-3-methyl-5,6-trimethyleneisoxazolo[5,4-b]pyridine,
4-(p-isobutoxyphenyl)-3-methyl-5,6-trimethyleneisoxazolo[5,4-b]pyridine,
4-(o-chlorophenyl)-3-methyl-5,6-trimethyleneisoxazolo[5,4-b]pyridine, and
4-(p-iodophenyl)-3-methyl-5,6-trimethyleneisoxazolo[5,4-b]pyridine, The addition of a diethyl ether solution of hydrogen chloride, hydrogen bromide, sulfuric acid, phosphoric acid, acetic acid, benzoic acid, salicylic acid, citric acid, succinic acid, malic acid, cyclohexanesulfamic acid, thiocyanic acid or trichloroacetic acid, etc. to an ethanol solution of a 5,6-polymethyleneisoxazolo[5,4-b]pyridine set forth in the preceding paragraph, followed by addition of about 4 volumes of diethyl ether, gives its corresponding acid addition salt.

I claim:
1. A compound selected from the group consisting of (1) a compound of the formula

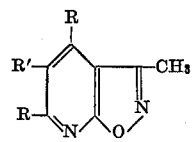

wherein R is selected from the group consisting of lower-alkyl, phenyl, lower-alkylphenyl, lower-alkoxyphenyl and halophenyl, wherein the lower-alkyl moiety of R is selected from the group consisting of methyl, ethyl, propyl, isopropyl, butyl, isobutyl and secondary butyl, R' has the same meaning as R and in addition hydrogen, and (2) an acid addition salt theerof.

2. A compound of claim 1 wherein R is methyl and R' is hydrogen, namely, 3,4,6-trimethylisoxazolo[5,4-b]pyridine.

3. A compound of claim 1 wherein R is methyl and R' is phenyl, namely, 3,4,6-trimethyl-5-phenylisoxazolo[5,4-b]pyridine.

4. A compound of claim 1 wherein R is phenyl and R' is hydrogen, namely, 3-methyl-4,6-diphenylisoxazolo[5,4-b]pyridine.

5. A compound selected from the group consisting of (1) a compound of the formula

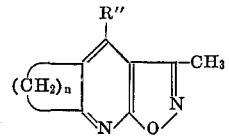

wherein R" is selected from the group consisting of phenyl, lower-alkylphenyl, lower-alkoxyphenyl and halophenyl, wherein the lower-alkyl moiety of R is selected from the group consisting of methyl, ethyl, propyl, isopropyl, isopropyl, butyl, isobutyl and secondary butyl, $n$ is an integer of from 3 to 6, inclusive, and (2) an acid addition salt thereof.

6. A compound of claim 5 wherein R" is p-methoxyphenyl and $n$ is 4, namely, 4-(p-methoxyphenyl)-3-methyl-5,6-tetramethyleneisoxazolo[5,4-b]pyridine.

References Cited
UNITED STATES PATENTS

| | | | |
|---|---|---|---|
| 3,005,824 | 10/1961 | Domagr | 260—288 |
| 3,336,306 | 8/1967 | Sulkowski | 260—288 X |
| 3,381,016 | 4/1968 | Markillie | 260—296 |

DONALD G. DAUS, Primary Examiner

U.S. Cl. X.R.
260—286, 296, 307, 586, 591, 593